Jan. 26, 1926.
G. MERZ
1,570,908
SHOCK ABSORBER
Filed July 7, 1925
2 Sheets-Sheet 1
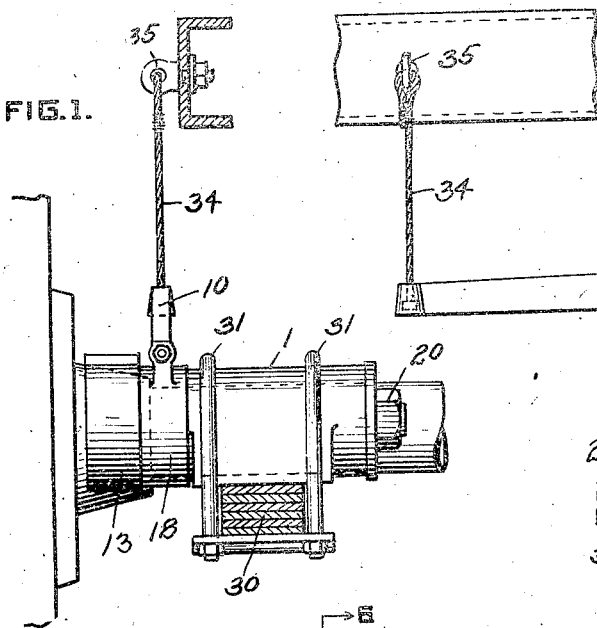
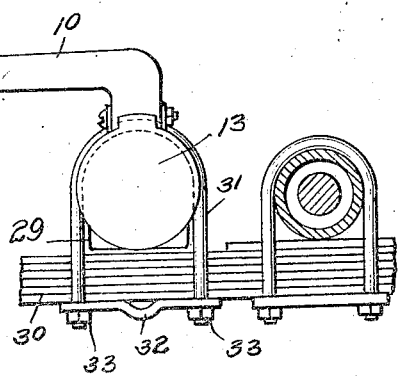
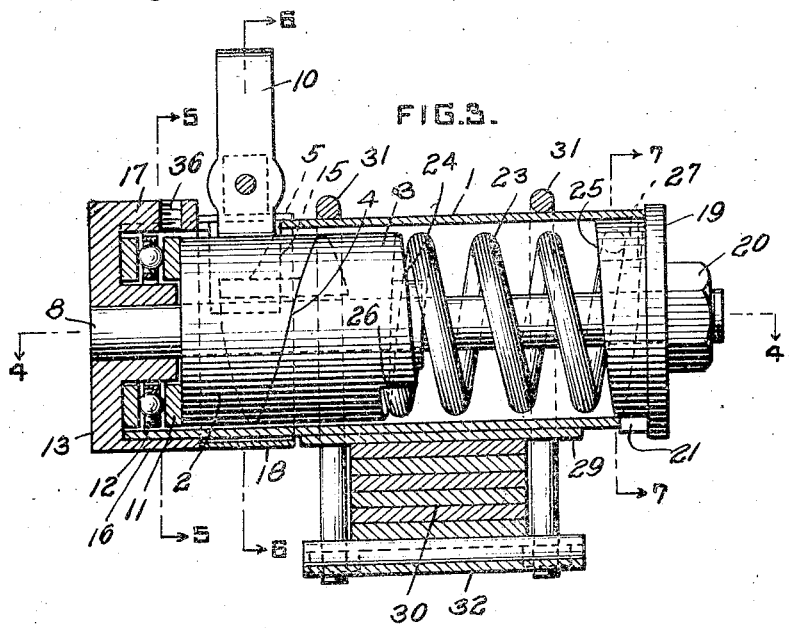
WITNESSES
J. Herbert Bradley
INVENTOR
Gottlieb Merz
By
Winter, Brown & Critchlow
his Attorneys Jan. 26, 1926. 1,570,908
G. MERZ
SHOCK ABSORBER
Filed July 7, 1925   2 Sheets-Sheet 2
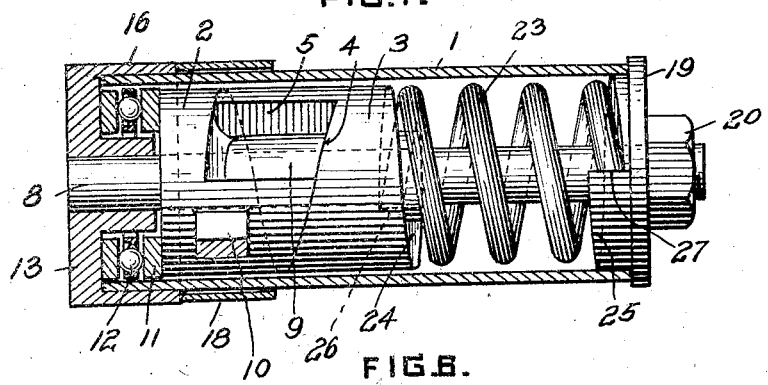
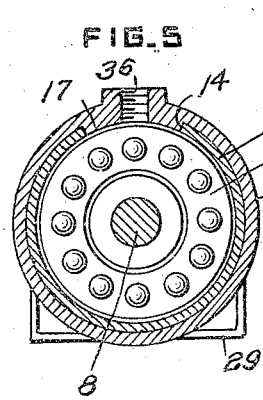
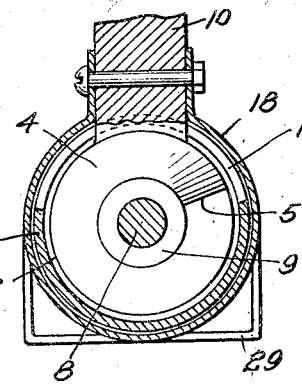
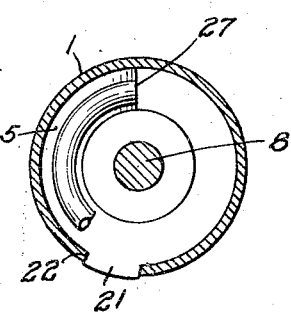
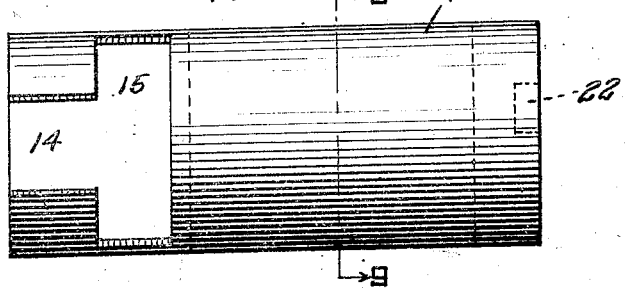
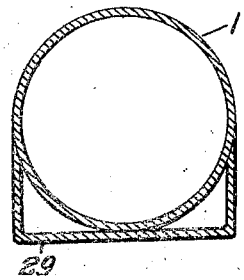
WITNESSES.
A Herbert Bradley.
INVENTOR
Gottlieb Merz.
By
Winter, Brown & Critchlow
his Attorneys Patented Jan. 26, 1926.

1,570,908

UNITED STATES PATENT OFFICE.

GOTTLIEB MERZ, OF McKEESPORT, PENNSYLVANIA.

SHOCK ABSORBER.

BEST AVAILABLE COPY

Application filed July 7, 1925. Serial No. 42,002.

*To all whom it may concern:*

Be it known that I, GOTTLIEB MERZ, a citizen of the United States, and a resident of McKeesport, in the county of Allegheny and State of Pennsylvania, have invented a new and useful Improvement in Shock Absorbers, of which the following is a specification.

This invention relates to shock absorbers for vehicles, particularly for automobiles, and of the kind which remains inactive when the springs are compressed but becomes active when the springs expand to limit the upward rebound of the vehicle body. The object of the invention is to provide a shock absorber which is strong and durable, which can not easily get out of order, which can be readily applied to a vehicle, which contains only a few parts which can be cheaply manufactured and readily assembled and disassembled, and in which the wearing parts are enclosed and protected from dirt and therefore capable of being kept thoroughly lubricated.

In the accompanying drawings, Fig. 1 is an end elevation, partly in section, of a portion of a vehicle showing one manner of applying the shock absorber thereto; Fig. 2 is a view at right angles to Fig. 1; Fig. 3 is a vertical longitudinal sectional view through the working cylinder or casing of the device; Fig. 4 is a similar section on the plane indicated by the line 4—4, on Fig. 3; Figs. 5, 6 and 7 are transverse sections taken respectively on the lines 5—5, 6—6 and 7—7, Fig. 3; Fig. 8 is a top view of the cylinder or casing; and Fig. 9 is a transverse section thereof on the line 9—9, Fig. 8.

The working parts of the device illustrated are enclosed in a casing 1, which has a cylindrical bore and which is of such external contour that it can be mounted upon a suitable part of the vehicle in a convenient manner. Mounted side by side in the casing 1 are a pair of cooperating cam members 2 and 3, the former of which is rotatable on the longitudinal axis of the casing but axially immovable therein, while the latter is non-rotatable but axially movable. The contacting side faces of these cam members are provided with complementary cam faces 4 which are spirals extending completely around each of the members and are indicated by a spiral line on Figs. 3 and 4. The ends of the spirals being united by longitudinal shoulders 5. The result is that the end faces of these two cam members are in contact the entire way around when said cams are in their closest approached positions. Externally the cam members are circular and have a good rotating fit in the cylindrical bore of the casing. Each cam member is provided with an axial hole through which extends a guide rod 8, and in addition the member 2 has a cylindrical axial sleeve 9 which rotatably fits in a corresponding cylindrical recess in the member 3. Consequently these two members are guided rather accurately in their movements relative to each other.

The cam member 2 is rotated by means of an arm 10 extending radially therefrom and operated as hereinafter described. Endwise movement of member 2 is prevented by its bearing on a washer 11 which is backed by a ball bearing 12 seated in the cap 13 which closes one end of the casing 1. This end of the casing 1 is provided with a longitudinal slot 14 which joins a circumferential slot 15 extending about half way around the casing a short distance from its end. The cam member 2 with its attached operating arm 10 is inserted in the casing by sliding it endwise therein, the arm 10 passing through the longitudinal slot 14 until it comes into the plane of the circumferential slot 15, which latter slot permits said arm to have a radial movement through somewhat over 90°. The end cap 13 is provided with a flange 16 which slips snugly over the end of the casing and extends inwardly substantially to the outer edge of the circumferential slot 15. Said cap flange is provided with an inwardly projecting thickened portion 17 which enters the longitudinal slot 14 and serves to prevent the end cap from turning on the casing. The guide rod 8 is shown fixed rigidly to this end cap although such rigid connection is not absolutely necessary. Secured to the arm 10 is a circular shield 18 which surrounds the casing 1 and covers the circumferential slot 15 to prevent the entrance of dirt at this point.

The opposite end of the casing is tightly closed by means of a cap 19 which seats on the end of the casing and has a portion projecting into the casing. This cap is clamped in position by means of a nut 20 on the outer end of the guide rod 8 which projects through a hole in said cap. This cap is further provided with a projection 21 which enters a notch 22 in the said end of the casing and thus holds this end cap against rotation.

Interposed between the axially movable cam member 3 and the end cap 19 is a strong helical spring 23, which is initially put under compression and which becomes further compressed when the cam member 2 is rotated to move the cam member 3 longitudinally, as will be apparent. Both the outer face of cam member 3 and the inner face of cap 19 are formed with spiral seats, marked 24 and 25, respectively, for the ends of the spring 23. These seats of course end in transverse shoulders, marked 26 on the cam member 3 and 27 on the end cap 19, against which shoulders the ends of the helical coil naturally abut. Hence, any tendency of the cam member 3 to rotate tends to put a torsional twist in the helical spring 23, but as this spring is very strong it effectively restrains rotation of the cam member 3, so that the movement of said member under the action of the rotary cam member 2, is wholly in an axial direction, putting the spring 23 under compression.

When the parts are assembled as described, it is manifest that the movement of the arm 10 in one direction, will rotate the cam 2, and cause its cam face 4 to ride over the corresponding cam face of member 3, and since the latter is held against rotary movement by spring 10 and end cap 19 fixed to the end of the casing, the only movement of which cam member 3 is capable is in a direction to put the spring 23 under compression. This naturally causes heavy friction between the cam faces of members 2 and 3 and tends to check the rotary movement of the member 2 in the direction in which it is moving, and this, of course checks the movement of the part to which arm 10 is connected. Movement of the arm 10 to rotate cam member 2 in the direction to compress spring 23 as described takes place only on the rebound of the body of the vehicle, that is, when the vehicle springs expand, and therefore checks the sudden upward movement of the vehicle body. When the vehicle springs are compressed, the pull on the arm 10 is relieved, whereupon the expansion of spring 23, due to the slope of the cam faces 4, returns the cam member 2 to its original position.

The device described can be attached to a vehicle in any desired way. As a matter of fact the particular place and manner of attachment will depend somewhat upon the place on the vehicle to which the shock absorber can best be applied. In the drawings one typical way of attaching to the vehicle is shown. As here illustrated the cylindrical casing 1 has formed thereon or attached thereto a non-circular portion 29 forming a flat bottom face which is shown as seated on one of the springs 30 of the vehicle, and attached to said spring by means of U-bolts 31 embracing the casing and secured below the spring by a retaining plate 32 and nuts 33. Different fastening means of course will be used in case the device is to be fastened to some other part of the vehicle than the spring. The end of arm 10 will be connected to the other part of the vehicle (in the illustrated instance to the body of the vehicle) by any suitable means, that shown being a flexible connector 34 (a small cable or the like) secured to the end of arm 10 and to a convenient attachment on the vehicle frame at 35. As all of these parts will be modified according to the vehicle or the views of the manufacturer or user, they are not further described.

The device described can manifestly be made in rights and lefts, in order to permit them to be positioned in symmetrical relation on opposite sides or opposite ends of the vehicle. The casing 1 is provided with a hole 36 for the admission of grease or other lubricant.

The device described is of simple construction, has a minimum number of simple parts which are cheap to manufacture, which when assembled cannot readily get out of order, and which can be readily taken apart when desired, and all of the wearing parts are housed in a casing which can be filled with a lubricant up to the slot 15, thus permitting very thorough and effective lubrication, which tends to long life.

I claim:

1. A shock absorber comprising a casing, a cam member rotatably but axially immovably mounted in said casing, a second cam member mounted for axial movement in the casing, said cam members being provided with complementary contacting cam faces, whereby rotation of the first members moves the second axially, a fixed abutment in the outer end of the casing, a compression spring between said abutment and the axially movable cam member and arranged to prevent rotation of the latter, and means to rotate the first-named cam member to thereby axially move the second and compress said spring.

2. A shock absorber comprising a casing having a circular axial bore, a cam member rotatably but axially immovably mounted in one end of said casing, a second cam member mounted for axial movement in said casing, said members having complementary contacting cam faces, whereby rotation of the first will move the second axially, a fixed abutment in the outer end of the casing, a helical compression spring between said abutment and said axially movable cam member, said abutment and said axially movable member being each provided with a shoulder engaged by the ends of the spring, whereby the spring prevents rotation of the axially movable cam member, and means to rotate the first-named cam member to thereby move the second-named member axially and compress said spring.

3. A shock absorber comprising a casing having a circular bore, a cap non-rotatably secured to and tightly closing one end of the casing, a cam member rotatably mounted in said casing and having endwise bearing against said cap, a second cam member mounted in said casing for axial movement, said cam members having complementary contacting cam faces whereby rotation of the first will move the second axially, a cap non-rotatably secured to and tightly closing the opposite end of said casing, a compression spring between said last named cap and said axially movable cam member, the ends of said spring interlocked with said last named cap and said axially movable member block, and thereby preventing rotation of the axially movable member, and means to rotate the first-named cam member to thereby move the second named member axially and compress said spring.

4. A shock absorber comprising a substantially cylindrical casing provided at one end with a short longitudinal slot terminating in a segmental circumferential slot, a cam member provided with a radial arm inserted endwise into said casing and rotatable therein, a cap secured to the end of said casing and provided with a projection entering the longitudinal slot in the casing and being thereby held against rotation and serving as a seat to prevent endwise movement of the rotatable cam member, a flange on said cap covering the longitudinal slot in the casing, a circular shield secured to the said arm and covering the circumferential slot in the casing, a second cam member mounted in the casing for axial movement, said two cam members having complementary contacting cam faces, whereby rotation of the first will move the second axially, an abutment in the outer end of said casing, and a compression spring between said abutment and said axially movable cam member arranged to be compressed when said cam member moves axially.

5. A shock absorber comprising a substantially cylindrical casing provided at one end with a short longitudinal slot terminating in a segmental circumferential slot, a cam member provided with a radial arm inserted endwise into said casing and rotatable therein, a cap secured to the end of said casing and provided with a projection entering the longitudinal slot in the casing and being thereby held against rotation and serving as a seat to prevent endwise movement of the rotatable cam member, a flange on said cap covering the longitudinal slot in the casing, a circular shield secured to the said arm and covering the circumferential slot in the casing, a second cam member mounted in the casing for axial movement, said two cam members having complementary contacting cam faces, whereby rotation of the first will move the second axially, a cap tightly closing the outer end of the casing and non-rotatably secured thereto, and a helical compression spring between said cap and the axially movable cam member, said cap and said axially movable member being provided with shoulders abutting the ends of said spring, whereby the latter prevents rotation of the axially movable cam member.

In testimony whereof, I sign my name.

GOTTLIEB MERZ.